(12) United States Patent
Kwon et al.

(10) Patent No.: US 8,149,945 B2
(45) Date of Patent: Apr. 3, 2012

(54) TRANSMITTER HAVING FULL-DIVERSITY AND FULL-RATE, A LINEAR SPACE-TIME CODE GENERATING METHOD FOR THE TRANSMITTER, AND A MIMO SYSTEM USING SAME

(75) Inventors: DongSeung Kwon, Daejeon (KR); Seong Keun Oh, Daejeon (KR); Moon Il Lee, Daejeon (KR); Seung Joon Lee, Daejeon (KR); Jong-Ee Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 578 days.

(21) Appl. No.: 12/346,148

(22) Filed: Dec. 30, 2008

(65) Prior Publication Data

US 2009/0202015 A1 Aug. 13, 2009

Related U.S. Application Data

(63) Continuation of application No. PCT/KR2006/004165, filed on Oct. 16, 2006.

(30) Foreign Application Priority Data

Jun. 30, 2006 (KR) .................. 10-2006-0060124

(51) Int. Cl.
*H04L 1/02* (2006.01)
(52) U.S. Cl. ....................................................... 375/267
(58) Field of Classification Search .................. 375/267, 375/299, 347, 349; 700/53; 455/101, 132–141
See application file for complete search history.

(56) References Cited

U.S. PATENT DOCUMENTS

2005/0185734 A1* 8/2005 Hottinen et al. ............. 375/295
2007/0014377 A1* 1/2007 Pirak et al. .................... 375/267

FOREIGN PATENT DOCUMENTS

KR 10-2006-0043279 5/2006
WO 2006/025635 3/2006

OTHER PUBLICATIONS

Robert W. Heath, Jr., "Capacity Maximizing Linear Space-Time Codes", Paper Special Issue on Signals, Systems and Electronics Technology, IEICE Trans. Electron, vol. E85-C, No. 3, Mar. 2002, pp. 428-435.

(Continued)

*Primary Examiner* — Sam K Ahn
(74) *Attorney, Agent, or Firm* — Kile Park Goekjian Reed & McManus PLLC

(57) ABSTRACT

A space-time code has a codeword matrix. The codeword matrix is a square matrix with dimension equal to the number of the transmit antennas, wherein a row of the codeword matrix represents combined signals transmitted by each transmit antenna and a column of the codeword matrix represents timeslots of the number of the transmit antennas. Signals are transmitted through the rows of the number of spatial multiplexing rate, in each column of the matrix. Further, the symbols of the number of the transmit antennas are combined by way of utilizing complex weights, in each row of the matrix. With this space-time code, a delay is minimized, so that change of channels can be managed efficiently. Also, the space-time code has minimum number of data symbols, and thus its complexity is minimized.

17 Claims, 10 Drawing Sheets

OTHER PUBLICATIONS

Huan Yao et al., "Structured Space-Time Block Codes With Optimal Diversity-Multiplexing Tradeoff and Minimum Delay", IEEE Global Telecommunications Conference, vol. 4, Dec. 1-5, 2003, pp. 1941-1945.

Jean-Claude Belfiore et al.,"The Gloden Code: A 2 X 2 Full-Rate Space-Time Code with Non-Vanishing Determinants", International Symposium on Information Theory, ISIT 2004, pp. 310.

Moon Il Lee et al., "Design of Space-Time Codes Achieving Generalized Optimal Diversity", IEEE Global Telecommunications Conference, Nov. 28-Dec. 2, 2005, vol. 5, pp. 3027-3031.

Siavash M. Alamouti, "A Simple Transmit Diversity Technique for Wireless Communications", IEEE Journal on Select Areas in Communications, vol. 16, No. 8, Oct. 1998.

Mohamed Oussama Damen et al., "Linear Threaded Algebraic Space-Time Constellations", IEEE Transactions on Information Theory, vol. 49, No. 10, Oct. 2003.

G. D. Golden et al., "Detection algorithm and initial laboratory results using V-BLAST space-time communication architecture", Electronics Letters, vol. 35, No. 1, Jan. 7, 1999.

International Search Report—PCT/KR2006/004165 dated Oct. 29, 2007.

Written Opinion—PCT/KR2006/004165 dated Oct. 29, 2007.

* cited by examiner

TRANSMITTER HAVING FULL-DIVERSITY AND FULL-RATE, A LINEAR SPACE-TIME CODE GENERATING METHOD FOR THE TRANSMITTER, AND A MIMO SYSTEM USING SAME

This application is a continuation application of PCT international application serial number PCT/KR2006/004165 filed on Oct. 16, 2006, which is designated the United States.

CROSS-REFERENCE(S) TO RELATED APPLICATION(S)

The present invention claims priority of Korean Patent Application No. 10-2006-0060124, filed on Jun. 30, 2006, which is incorporated herein by reference.

FIELD OF THE INVENTION

The present invention relates to a Multiple Input Multiple Output (MIMO) system; and, more particularly, to a transmitter having full-diversity and full-rate, a linear space-time code generating method for the transmitter, and a MIMO system using same.

BACKGROUND OF THE INVENTION

There has been rapid increase of demands for communication services such as a prevalence of communication services, an appearance of various multimedia services and high quality services, and the like. To meet the demands actively, first of all, capacity of communication systems should be increased, and as is more highly required in wireless communications than in wired communications. The reason is that, though available frequency resources are limited and should be shared in wireless communications, the demands for wireless communications are rapidly increasing because of the merits thereof. To increase communication capacity in wireless communication environments, there are two methods: one of them is finding available frequency bands and the other is increasing efficiency of the existing resources. Techniques receiving much attention recently and being developed actively as a method for increasing efficiency of the wireless resources are space-time code techniques, which increase reliability through a diversity gain without increasing bandwidth but by obtaining additional spatial region for utilizing the wireless resources by way of attaching any number of antennas on transmitters/receivers, or increase transmit capacity through parallel transmissions by spatial multiplexing.

Capacity of wireless channels can be increased reasonably by employing MIMO technique. Space-time block code technique is proposed by Alamouti, 'A simple transmit diversity technique for wireless communications', IEEE JSAC, vol. 16, no. 8, October 1998, and is a representative transmit diversity technique for overcoming fadings in wireless channels by using any number of antennas in transmitters/receivers. According to this technique, two antennas are used for transmissions and diversity order is the number of transmit antennas multiplied by the number of receive antennas; thus, full-diversity gain can be obtained. However, transmit rate is a value of 1 because only two data signals can be transmitted during two timeslots through two transmit antennas; therefore, spatial multiplexing gain cannot be obtained without regard to the number of receive antennas. Further, transmit techniques for systems having more than three transmit antennas are not presented.

On the other hand, V-BLAST (Vertical Bell Laboratories Layered Space-Time) system proposed by Bell Lab ('Detection algorithm and initial laboratory results using V-BLAST space-time communication architecture', IEE, Vol. 35, No. 1, pp. 14~16, 1999) is a representative technique for obtaining spatial multiplexing gain. In accordance with this technique, in a transmitter, each of the transmit antennas transmits different signals at the same transmit power and rate, and, in a receiver, transmitted signals are detected through three steps and executed thereby: detection ordering; interference nulling; and interference cancellation. Accordingly, unnecessary interferences are removed in sequence, then, SNR (Signal-to-Noise Ratio) can be raised highly. In addition, if the number of the receive antennas is equal to or greater than the number of the transmit antennas, separate data signals corresponding to the number of the transmit antennas can be transmitted at the same time; thus, spatial multiplexing gain can be fully maintained. However, because the number of the receive antennas should be greater than the number of the transmit antennas and diversity order should be maintained a value of 1 to obtain full multiplexing gain, diversity gain cannot be obtained. Therefore, if a signal is restored wrongly in bad channel environments, it affects detecting of a next signal to be transmitted; thus, drastic declines of the performance can be occurred.

Unlike the two foregoing techniques, in recent, there has been published a lot of LD-STC (Linear Dispersion Space-Time Code) using a linear dispersion matrix for FDFR (Full Diversity Full Rate) with optimal diversity-multiplexing tradeoff, which is proposed by Zheng and Tse. An LD-STC is a space-time code for obtaining diversity gain and multiplexing gain at the same time by way of properly combining and transmitting data symbols by using a dispersion matrix. A multiple antenna system using a linear space-time code in a vector-matrix form is represented in Equation 1.

$$\underbrace{\begin{bmatrix} y_0 \\ y_1 \\ \vdots \\ y_{MT-1} \end{bmatrix}}_{Y} = \underbrace{\underbrace{\begin{bmatrix} [H_1] & & & \\ & [H_2] & & \\ & & \ddots & \\ & & & [H_T] \end{bmatrix}}_{H_{stack}} \underbrace{\begin{bmatrix} w^1_{1,0} & w^1_{1,1} & \cdots & w^1_{1,RT-1} \\ w^1_{2,0} & w^1_{2,1} & \cdots & w^1_{2,RT-1} \\ \vdots & \vdots & \ddots & \vdots \\ w^T_{N,0} & w^T_{N,1} & \cdots & w^T_{N,RT-1} \end{bmatrix}}_{\Phi}}_{H_{eq}} \underbrace{\begin{bmatrix} S_0 \\ S_1 \\ \vdots \\ S_{RT-1} \end{bmatrix}}_{S} + \underbrace{\begin{bmatrix} n_0 \\ n_1 \\ \vdots \\ n_{MT-1} \end{bmatrix}}_{N} \quad \text{(Equation 1)}$$

In Equation 1 above, Y is a received signal vector and $H_{stack}$ shows a multiple antennas channel matrix corresponding to several timeslots. Further, S refers to a transmit signal vector and N represents a Gaussian noise vector. Here, $\Phi$ is a linear dispersion matrix of the space-time code; as known from Equation 1, the performance of the system is determined by $\Phi$ of the space-time code. Hence, the performance of the system depends on how to design the linear dispersion matrix $\Phi$.

There are some conventional linear dispersion space-time codes. As linear dispersion space-time codes optimized for multiple antennas systems having two transmit antennas, there are Tilted-QAM method ('Structured space-time block codes with optimal diversity-multiplexing tradeoff and minimum delay', Globecom, in Proc. Vol. 4, pp. 1941-1945, December 2003) proposed by Yao and Wornell, and Golden code ('The Golden code: a 2×2 full-rate space-time code with non-vanishing determinants', ISIT 2004, p. 310, July 2004) proposed by Belifiore, Rekaya, and Viterbo. Further, as for linear dispersion space-time codes capable of being designed regardless of the antenna structures, there are TAST code ('Linear threaded algebraic space-time constellations', ISIT 2003, pp. 2372-2388, October 2003) proposed by Damen, Gamal, and Beaulieu, and Heath code ('Capacity maximizing linear space-time code', IEICE vol. E85-C, no. 3, pp. 428-435, March 2002) proposed by Heath and Paulraj. However, there are some defects in the conventional linear space-time codes. Both Tilted-QAM and Golden codes are optimized only for multiple antennas environments having two transmit/receive antennas. In addition, as for TAST or Heath code, because utilizing and combining complex weights of an identical size cannot maximize coding gain, or generating random matrixes for searching a linear dispersion matrix results in excessively high complexity, looking for a dispersion matrix for an optimized performance is difficult. Hence, to defeat the defects therein, Lee and Oh proposed GOD method ('Design of space-time codes achieving generalized optimal diversity', Globecom, in CD, 2005). According to GOD method, because the code can be organized without regard to the antenna structure and spatial multiplexing rate, minimizing the constraints of the complex weights of the linear dispersion matrix raises the coding gain, and optimal linear dispersion matrix can be obtained readily by utilizing the power constraints and the orthogonal constraints; therefore, maximum diversity gain and coding gain can be obtained along with maintaining the multiplexing gain. However, with respect to GOD method, because the optimal complex weights varies according to the antenna structure and multiplexing rate, and the number of the complex weights increases rapidly as the number of the transmit antennas or the spatial multiplexing rate increases, the design complexity increases exponentially as the dimension of the space-time code increases.

SUMMARY OF THE INVENTION

It is, therefore, an object of the present invention to provide a transmitter having full diversity, full rate, and minimum delay by way of employing a space-time code made by a matrix, wherein in each column of the matrix, signals are transmitted only through the rows of the number of spatial multiplexing rate, but not through the other rows, and in each row of the matrix, symbols of the number of transmit antennas are combined using complex weights.

Another object of the present invention is to provide a method for generating the space-time code as set forth above, and a multiple antenna system for transmitting data symbols by using the generated space-time code.

In accordance with one aspect of the present invention, there is provided a transmitter for transmitting numerous information symbols for use in a MIMO (Multiple Input Multiple Output) system, which includes:

a space-time encoder for encoding data symbols provided thereto using a space-time code; and a number of transmit antennas for transmitting the encoded data symbols to a receiver, wherein a codeword matrix for transmitting symbols of the number of transmit antennas multiplied by spatial multiplexing rate in one coding block is a square matrix with dimension equal to the number of the transmit antennas;

wherein a row of the codeword matrix represents combined signals transmitted by each transmit antenna and a column of the codeword matrix represents timeslots of the number of the transmit antennas;

wherein the signals are transmitted through the rows of the number of spatial multiplexing rate, in each column of the matrix; and wherein the symbols of the number of the transmit antennas are combined by way of utilizing complex weights, in each row of the matrix.

In accordance with another aspect of the present invention, there is provided a method for generating a space-time code used for transmitting numerous information symbols to a receiver in a MIMO (Multiple Input Multiple Output) system having a number of transmit/receive antennas, which includes the steps of:

(a) setting the number of rows and columns of a codeword matrix determining the space-time code as the number of the transmit antennas, respectively, wherein the rows correspond to combined signals transmitted by each transmit antenna and the columns correspond to timeslots in one coding block;

(b) determining the number of the symbols to-be-transmitted in one coding block as the number of the transmit antennas multiplied by spatial multiplexing rate;

(c) selecting a specific column of the matrix, and assigning the symbols of the number of the transmit antennas to the rows of the number of spatial multiplexing rate in the selected column;

(d) assigning complex weights corresponding to the symbols assigned in the step (c) to each symbol to combine the symbols; and (e) repeating the steps (c) and (d) on the rest columns except for the selected columns in the step (c), while different symbols are assigned to each row and each column of the matrix and different complex weights are assigned to the identical symbols assigned to each column.

In accordance with still another aspect of the present invention, there is provided a multiple antenna system having a number of transmit/receive antennas, which includes:

a transmitter for generating space-time code to transmit data symbols through the transmit antennas in one coding block, the space-time code corresponding to the symbols of the number of the transmit antennas multiplied by spatial multiplexing rate; and a receiver for receiving data symbols transmitted by the transmitter by way of utilizing a number of receive antennas to restore the correspondent symbols by way of decoding the space-time code, wherein the space-time code has a codeword matrix, the codeword matrix being a square matrix with dimension equal to the number of the transmit antennas, a row of the codeword matrix representing combined signals transmitted by each transmit antenna and a column of the codeword matrix representing timeslots of the number of the transmit antennas;

wherein data symbols are transmitted not through the other rows but only through the rows of the number of spatial multiplexing rate, in each column of the matrix; and wherein data symbols of the number of the transmit antennas are combined by way of utilizing complex weights, in each row of the matrix.

In accordance with the present invention, it is possible to design a space-time coding technique having both high coding gain and minimum delay, for MIMO systems, which utilized several antennas in transmitter/receiver, especially in transmitter. With this code, change of channels can be managed efficiently because the code has minimum delay, and, if the receiver uses maximum induction detector, minimum complexity can be obtained because the codeword has minimum number of data symbols. Also, this novel coding technique can be applied to any multiple antenna systems, and structure of the code can be changed readily according to channel status, because the codeword may be defined systematically according to the number of the transmit/receive antennas and multiplexing rate. Moreover, the code in accordance with the present invention may be generated by rotatedly combining the codes of the number of multiplexing rate to transmit, which have multiplexing rate of a value of 1, thus, simplified structure capable of decreasing the design complexity by much is also available. In accordance with the present invention, by way of not transmitting through specific antennas in arbitrary timeslot if spatial multiplexing rate is smaller than the number of transmit antennas, interference between sub-codes, which combine determinant of difference matrixes of space-time codeword matrixes with different symbols, can be removed, and high coding gain can be obtained.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENT

Hereinafter, preferred embodiments of the present invention will be described in detail with reference to the accompanying drawings.

Figure 1:
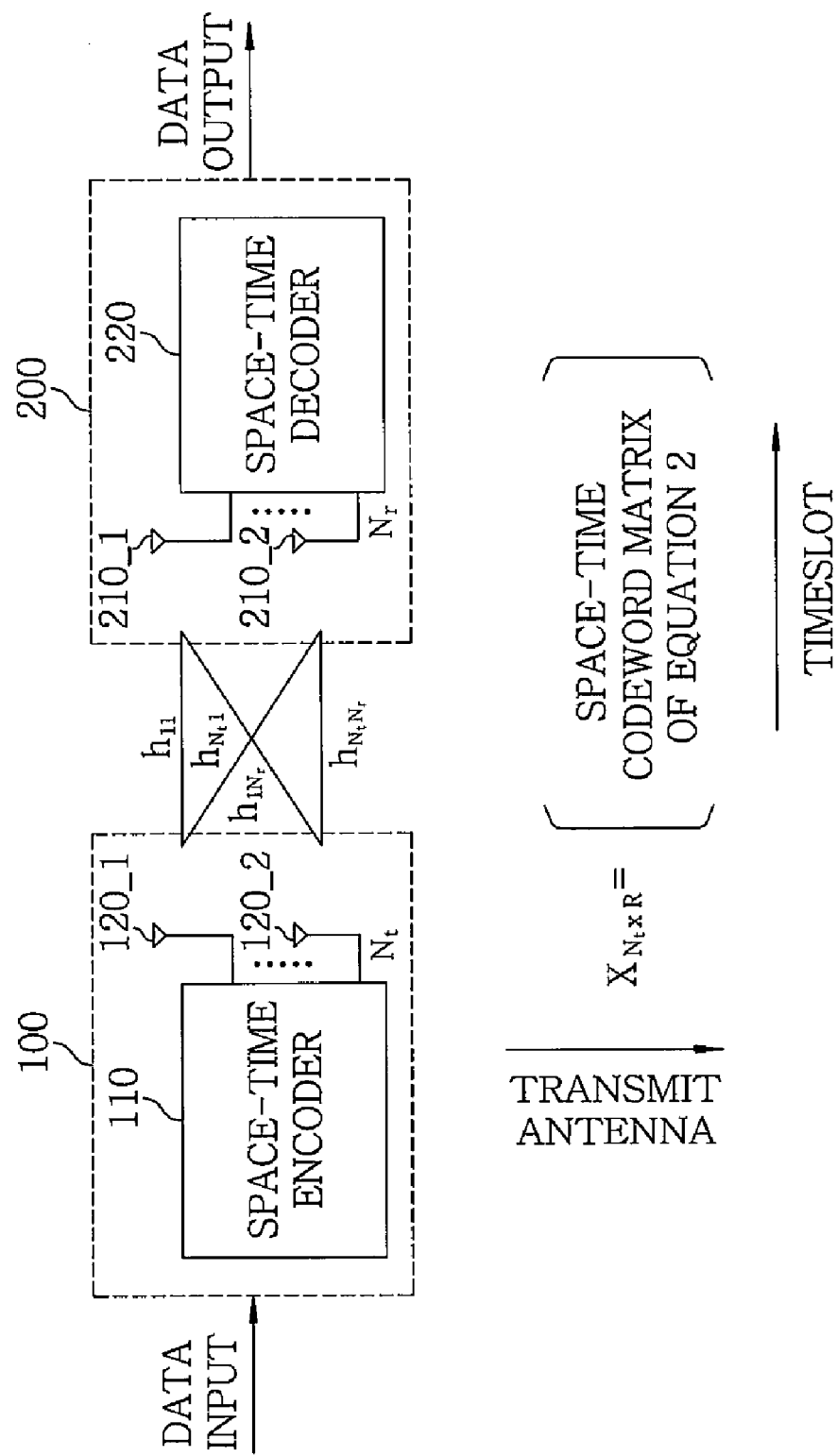
FIG. 1 is a block diagram of a multiple antenna system using a space-time code in accordance with the present invention.

Referring to FIG. 1, there is shown a block diagram of a multiple antenna system using a space-time code for obtaining full diversity and full rate in accordance with the present invention.

As shown in FIG. 1, a multiple antenna system in accordance with the present invention includes: a transmitter 100 which encodes data inputs by using a space-time code according to the present invention and transmits encoded data through a plurality number ($N_t$) of transmit antennas; and a receiver 200, which receives signals through several number ($N_r$) of receive antennas, decodes them by using the space-time code to detect information symbols.

The transmitter 100 has a space-time encoder and several number of transmit antennas 120_1, ..., 120_$N_t$.

The space-time encoder 110 generates the space-time code from the data symbol blocks provided thereto and transmits it to the receiver 200 through the transmit antennas 120_1, ..., 120_$N_t$.

The receiver 200 decodes the signals received through several number of receive antennas 210_1, ..., 210_$N_r$ by using the space-time code to restore the data symbols received from the transmitter 100.

According to the present invention, the space-time encoder 110 of the transmitter 100 and the space-time decoder 220 of the receiver 200 encodes/decodes by using the space-time code according to the present invention. The decoder 220 used in the receiver 200 may include a ML (Maximum Likelihood) decoder, a sphere decoder, or linear decoder.

In accordance with the present invention, a space-time code is a block code, and defined as a square matrix with dimension equal to the number of the transmit antennas, in which a row represents combined signals transmitted by each transmit antenna and a column represents timeslots of the number of the transmit antennas. In each column of the matrix, the signals are transmitted not through the rest of the rows, but only through a number of the rows determined based on the number of the spatial multiplexing rate. And, in each row of the matrix, the symbols of the number of the transmit antennas are combined by way of utilizing complex weights.

That is, if the number of transmit antennas is $N_t$, the number of receive antennas is $N_r$, and spatial multiplexing rate is R, a space-time code matrix transmitted through $N_t$ transmit antennas during $N_t$ timeslots can be represented as Equation 2. Herein, a condition of $\min(N_t, N_r) \geq R$ should be satisfied to obtain maximum spatial multiplexing gain; only R transmit antennas transmit the signals in each timeslot; and $N_t$ signals are combined and transmitted through each of the R transmit antennas during one timeslot. Further, a set of all symbols transmitted in one coding block is determined from a weighted combining of $N_t \times R$ symbols. Also, a multiple antenna system using such a space-time code matrix is illustrated in FIG. 1.

$$X_{N_t \times R} = \begin{bmatrix} \sum_{j=0}^{N_t-1} w_{1,j}^1 s_j & 0 & 0 & \cdots & \sum_{j=2N_t}^{3N_t-1} w_{1,j}^{N_t-1} s_j & \sum_{j=N_t}^{2N_t-1} w_{1,j}^{N_t} s_j \\ \sum_{j=N_t}^{2N_t-1} w_{2,j}^1 s_j & \sum_{j=0}^{N_t-1} w_{2,j}^2 s_j & 0 & \ddots & \vdots & \vdots \\ \vdots & \sum_{j=N_t}^{2N_t-1} w_{3,j}^2 s_j & \ddots & \sum_{j=(R-1)N_t}^{RN_t-1} w_{R-2,j}^{N_t-1} s_j & \vdots \\ \sum_{j=(R-1)N_t}^{RN_t-1} w_{R,j}^1 s_j & \vdots & \ddots & 0 & \sum_{j=(R-1)N_t}^{RN_t-1} w_{R-1,j}^{N_t} s_j \\ 0 & \sum_{j=(R-1)N_t}^{RN_t-1} w_{R+1,j}^2 s_j & \vdots & \ddots & \vdots & 0 \\ \vdots & 0 & \ddots & 0 & & \vdots \\ \vdots & \vdots & 0 & \ddots & \sum_{j=0}^{N_t-1} w_{N_t-1,j}^{N_t-1} s_j & 0 \\ 0 & 0 & 0 & \cdots & \sum_{j=N_t}^{2N_t-1} w_{N_t,j}^{N_t-1} s_j & \sum_{j=0}^{N_t-1} w_{N_t,j}^{N_t} s_j \end{bmatrix}$$ (Equation 2)

Wherein, $s_j$ represents the $j_{th}$ data symbol transmitted, and $w_{i,j}^t$ refers to a complex weight for combining the $j_{th}$ symbol transmitted through the $i_{th}$ antenna in the $t_{th}$ timeslot. To obtain minimum delay with the space-time code matrix, the number of the columns is always set to $N_t$.

Herein, the symbols assigned to each transmit antenna are combined by different complex weights. In addition, the codeword matrix is determined to transmit the same set of symbols as transmitted at different timeslot, at one timeslot in a coding block; assign any symbol to a specific transmit antenna once in the coding block; and assign the symbols to all transmit antennas at least once in the coding block.

Further, the codeword matrix is determined such that the set of symbols is assigned to each transmit antenna by cycle shift, that is, sets of symbols are cycle shifted on an antenna basis as the timeslots progress. When the cycle shifted symbols are combined during the progress of the timeslots, if the transmit antenna changed, complex weights combining the same set of symbols are also changed.

Figure 2:
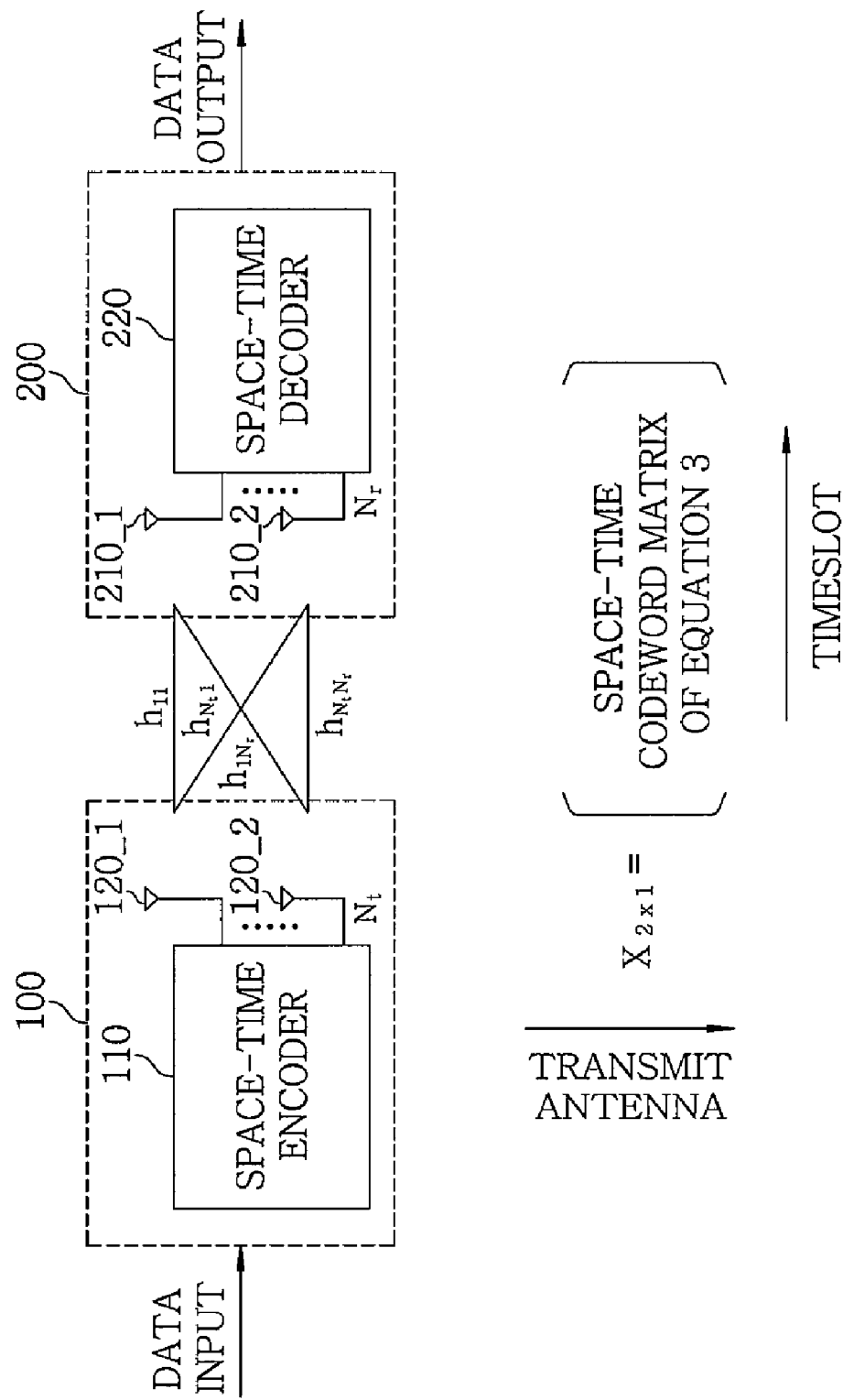
FIG. 2 shows an embodiment of a multiple antenna system using a space-time code in accordance with the present invention, wherein there are two transmit antennas and spatial multiplexing rate is a value of 1.

For example, a codeword of a space-time code, if $N_t=2$ and $R=1$, can be expressed as Equation 3. Also, a multiple antenna system using such a space-time codeword matrix is illustrated in FIG. 2.

$$X_{2 \times 1} = \begin{bmatrix} w_{1,0}^1 s_0 + w_{1,1}^1 s_1 & 0 \\ 0 & w_{2,0}^2 s_0 + w_{2,1}^2 s_1 \end{bmatrix}$$ (Equation 3)

In Equation 3, though the codeword matrix can have a variety of forms, basic concept is that, two symbols are weighted to combine and then transmitted in one antenna for one timeslot, and for other timeslot, the two symbols are combined with different weights and transmitted in other antenna. The optimal code in a system using Equation 3 can be obtained by optimizing the four complex weights in Equation 3 according to the design rule.

Figure 3:
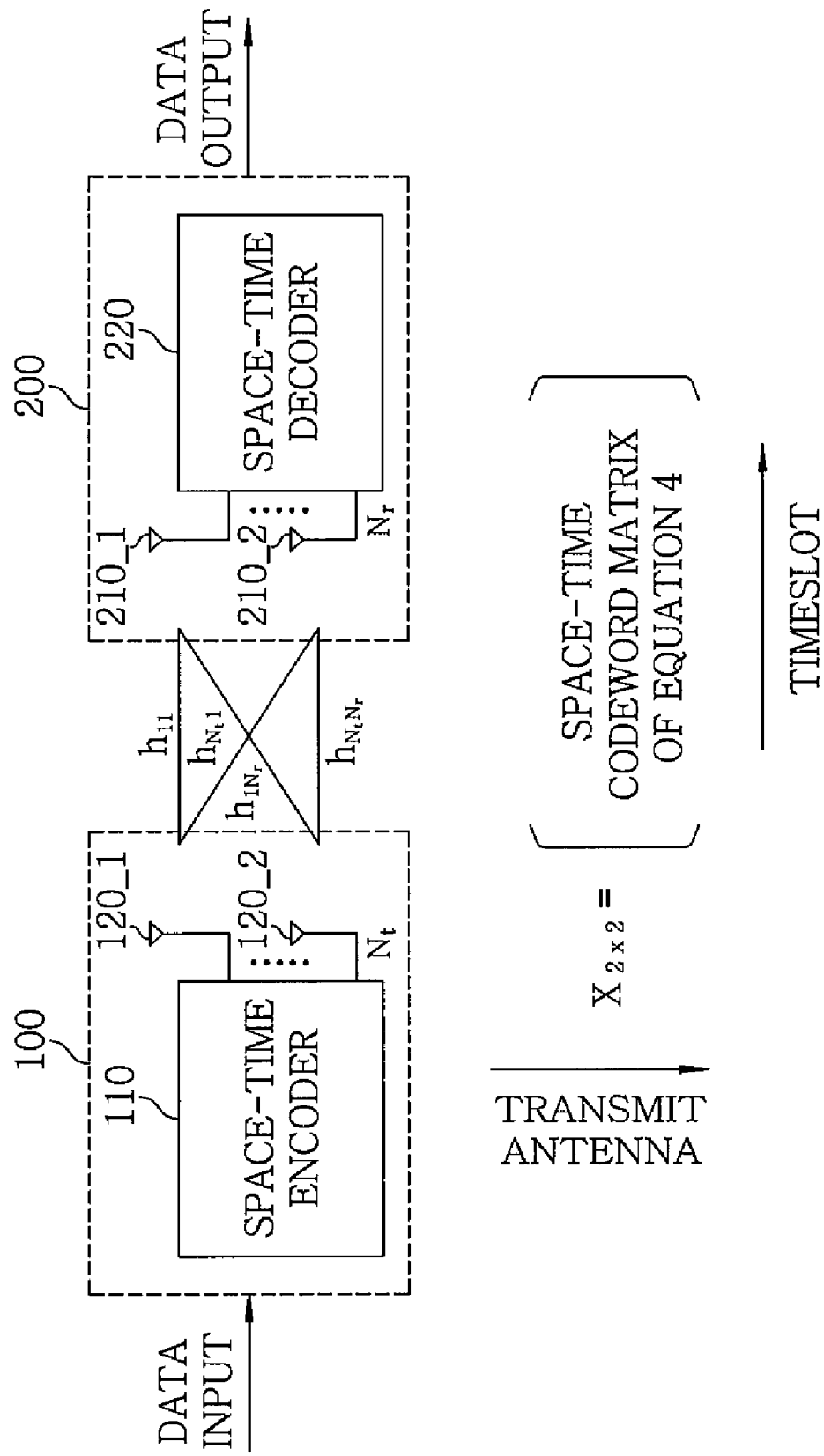
FIG. 3 presents an embodiment of a multiple antenna system using a space-time code in accordance with the present invention, wherein there are two transmit antennas and spatial multiplexing rate is a value of 2.

For example, a codeword of a space-time code, if $N_t=2$ and $R=2$, can be represented as Equation 4. Also, a multiple antenna system using such a space-time codeword matrix is illustrated in FIG. 3.

$$X_{2 \times 1} = \begin{bmatrix} w_{1,0}^1 s_0 + w_{1,1}^1 s_1 & w_{1,0}^2 s_2 + w_{2,1}^2 s_3 \\ w_{2,0}^1 s_2 + w_{2,1}^1 s_3 & w_{2,0}^2 s_0 + w_{2,1}^2 s_1 \end{bmatrix}$$ (Equation 4)

Figure 4:
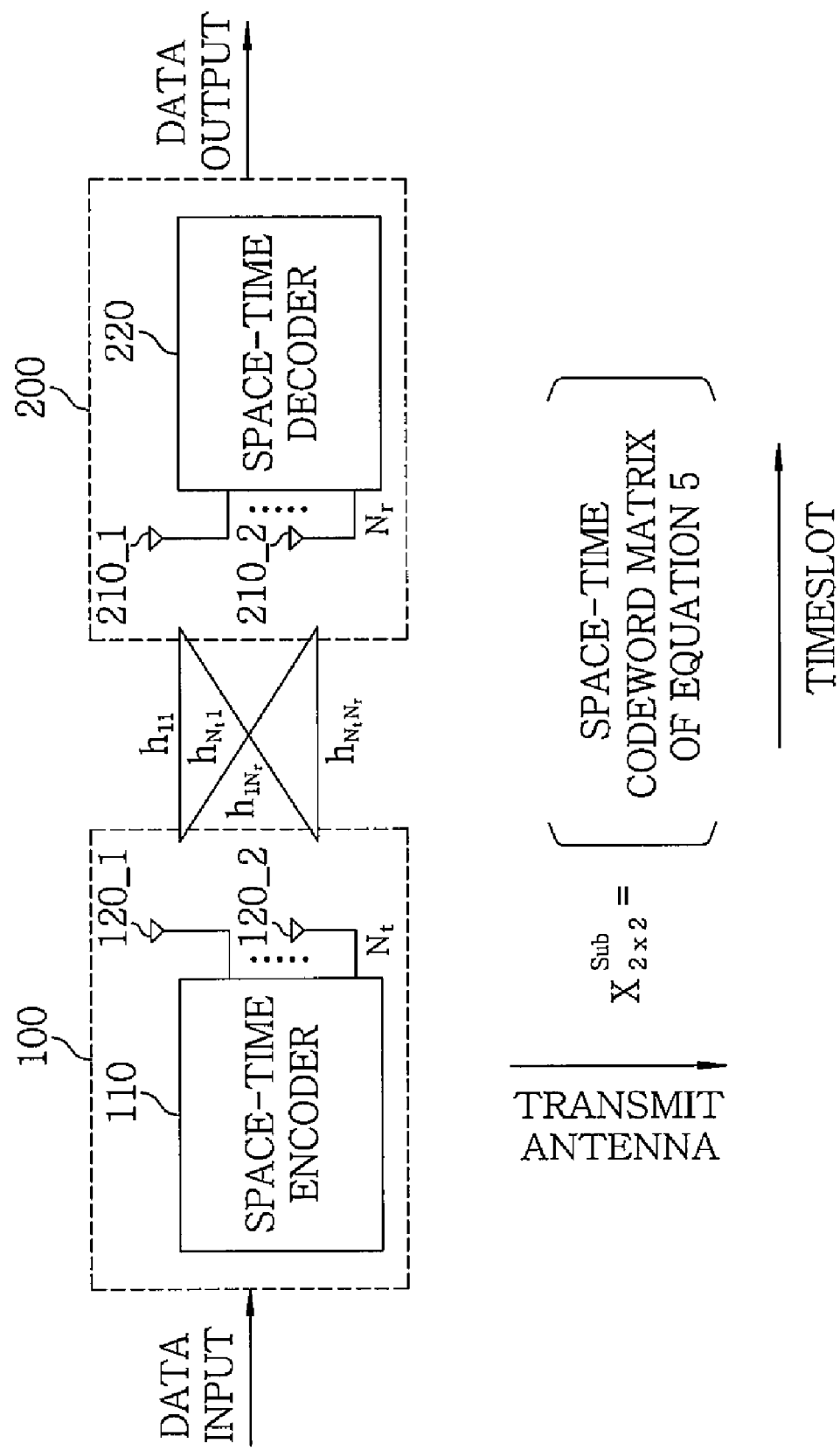
FIG. 4 illustrates an embodiment of a multiple antenna system using a space-time code in accordance with the present invention, wherein a space-time code matrix having two transmit antennas and spatial multiplexing rate of a value of 2 is obtained from a matrix having spatial multiplexing rate of a value 1 by rotated combining.

In Equation 4, the codeword matrix can have a variety of forms according to the combination of the signals of each antenna. The optimal code in a system embodied using Equation 4 can be obtained by optimizing the eight complex weights in Equation 4 according to the design rule. However, the number of the complex weights to be optimized increases as the number of the transmit antennas or spatial multiplexing rate increases, consequently, the design complexity increases exponentially. Hence, in accordance with the present invention, full-diversity and full-rate space-time code is designed, which is capable of obtaining a code having higher multiplexing rate, from a space-time code having spatial multiplexing rate of a value of 1, by rotated combining. For example, as shown in Equation 5, one space-time code $X_{2 \times 2}^{sub}$ having spatial multiplexing rate of a value of 2 can be obtained by rotated combining of two space-time codes $X_{2 \times 1}$ having spatial multiplexing rate of a value of 1. Also, a multiple antenna system using such a space-time codeword matrix is illustrated in FIG. 4.

$$X_{2 \times 2}^{Sub} = \begin{bmatrix} w_{1,0}^1 s_0 + w_{1,1}^1 s_1 & \{w_{2,0}^2 s_2 + w_{2,1}^2 s_3\} e^{j\theta_r} \\ \{w_{1,0}^1 s_2 + w_{1,1}^1 s_3\} e^{j\theta_r} & w_{2,0}^2 s_0 + w_{2,1}^2 s_1 \end{bmatrix}$$ (Equation 5)

Figure 5:
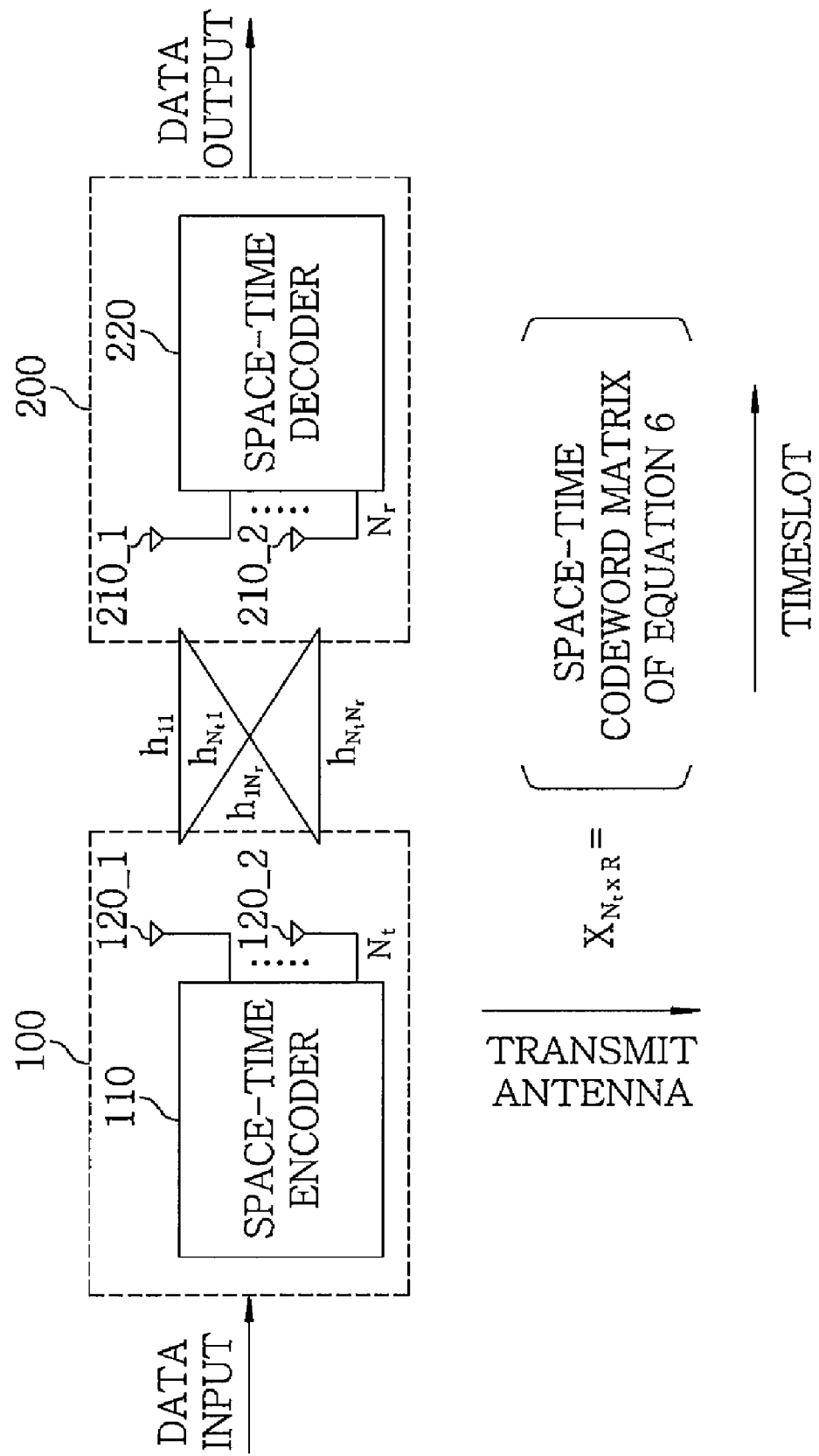
FIG. 5 shows an embodiment of a full-diversity and full-rate space-time code having generalized structure by way of using rotated combining in accordance with the present invention.

Herein, $\theta_r$ represents a phase angle for rotated combining. As shown in Equation 5, $X_{2 \times 1}$ having a set of data symbols of $s_0$, $s_1$ and $X_{2 \times 1}$ having a set of data symbols of $s_2$, $s_3$ are combined with a phase angle of $\theta_r$. Thus, if a space-time code is expanded in the above manner, compared to eight complex weights that should be optimized in Equation 4, it is possible to obtain full-diversity and full-rate space-time code by optimizing only four complex weights and one phase angle in Equation 5. Finally, by way of using the method above, full-diversity and full-rate space-time code having high spatial multiplexing rate under any antenna structure can be obtained more readily. Equation 6 describes a full-diversity and full-rate space-time code having generalized structure by way of using rotated combining. Moreover, a multiple antenna system using such a space-time codeword matrix is illustrated in FIG. 5.

$$X_{N_t \times R} = \qquad \text{[Equation 6]}$$

$$\begin{bmatrix} \sum_{j=0}^{N_t-1} w^1_{1,j}s_j & 0 & 0 & \cdots & \Theta^2 \sum_{j=2N_t}^{3N_t-1} w^{N_t-1}_{1,j}s_j & \Theta^1 \sum_{j=N_t}^{2N_t-1} w^{N_t}_{1,j}s_j \\ \Theta^1 \sum_{j=N_t}^{2N_t-1} w^1_{2,j}s_j & \sum_{j=0}^{N_t-1} w^2_{2,j}s_j & 0 & \ddots & \vdots & \vdots \\ \vdots & \Theta^1 \sum_{j=N_t}^{2N_t-1} w^2_{3,j}s_j & \ddots & \Theta^{R-1} \sum_{j=(R-1)N_t}^{RN_t-1} w^{N_t-1}_{R-2,j}s_j & & \vdots \\ \Theta^{R-1} \sum_{j=(R-1)N_t}^{RN_t-1} w^1_{R,j}s_j & \vdots & \ddots & 0 & & \Theta^{R-1} \sum_{j=(R-1)N_t}^{RN_t-1} w^{N_t}_{R-1,j}s_j \\ 0 & \Theta^{R-1} \sum_{j=(R-1)N_t}^{RN_t-1} w^2_{R+1,j}s_j & \ddots & \vdots & & 0 \\ \vdots & 0 & \ddots & 0 & & \vdots \\ \vdots & \vdots & 0 & \sum_{j=0}^{N_t-1} w^{N_t-1}_{N_t-1,j}s_j & & 0 \\ 0 & 0 & 0 & \cdots & \Theta^1 \sum_{j=N_t}^{2N_t-1} w^{N_t-1}_{N_t,j}s_j & \sum_{j=0}^{N_t-1} w^{N_t}_{N_t,j}s_j \end{bmatrix}$$

Wherein $\Theta^i$, $i=1, \ldots, R-1$ is the $i_{th}$ combining coefficient for rotated combining of the R space-time codes having spatial multiplexing rate of a value of 1.

Figure 6:
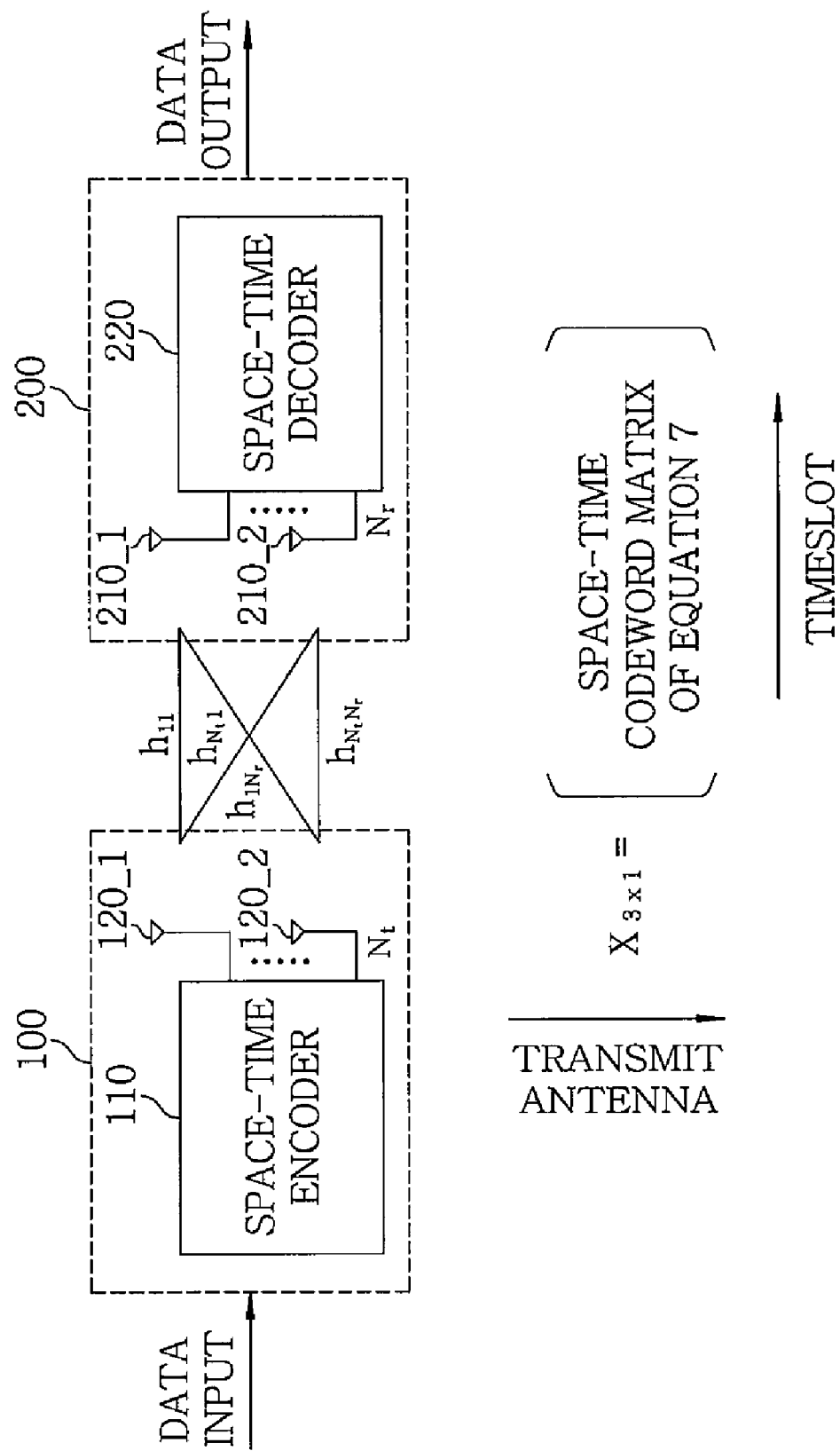
FIG. 6 describes an embodiment of a multiple antenna system using a space-time code in accordance with the present invention, wherein there are three transmit antennas and spatial multiplexing rate is a value of 1.

For example, a codeword of a space-time code, if $N_t=3$ and $R=1$, can be represented as Equation 7. Also, a multiple antenna system using such a space-time codeword matrix is illustrated in FIG. 6.

$$X_{3 \times 1} = \begin{bmatrix} w^1_{1,0}s_0 + w^1_{1,1}s_1 + w^1_{1,2}s_2 & 0 & 0 \\ 0 & w^2_{2,0}s_0 + w^2_{2,1}s_1 + w^2_{2,2}s_2 & 0 \\ 0 & 0 & w^3_{3,0}s_0 + w^3_{3,1}s_1 + w^3_{3,2}s_2 \end{bmatrix} \qquad \text{[Equation 7]}$$

In Equation 7, though the codeword matrix can have a variety of forms, basic concept is that, three symbols are weighted to combine and then transmitted in one antenna for one timeslot, and for other timeslot, the three symbols are combined with different weights and transmitted in other antenna.

Figure 7:
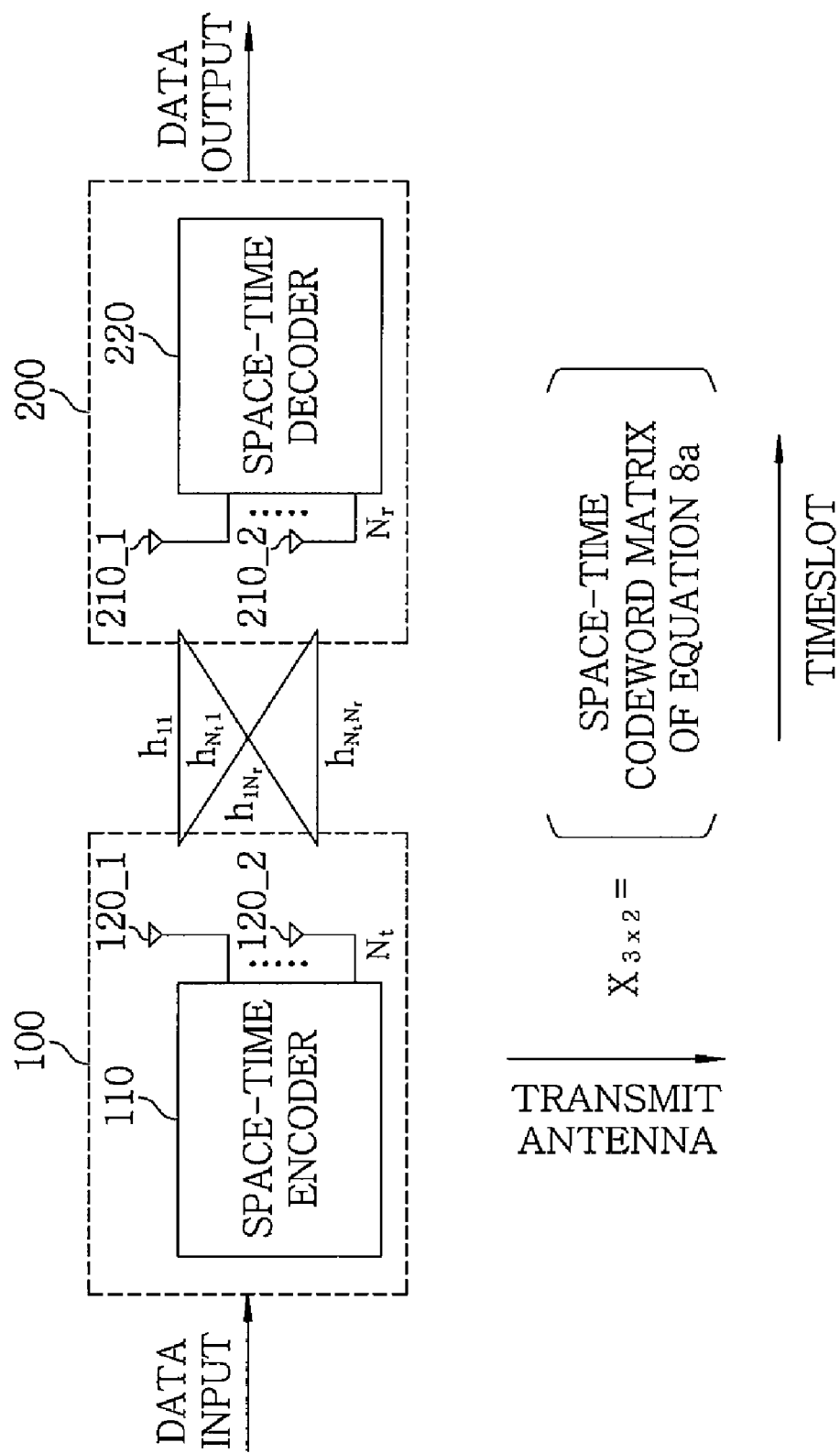
FIG. 7 is an embodiment of a multiple antenna system using a space-time code in accordance with the present invention, wherein there are three transmit antennas and spatial multiplexing rate is a value of 2.

As an example obtained by expansion of Equation 7, a codeword of a space-time code, if $N_t=3$ and $R=2$, can be expressed as Equation 8a. Also, a multiple antenna system using such a space-time codeword matrix is illustrated in FIG. 7.

$$X_{3 \times 2} = \qquad \text{[Equation 8a]}$$

$$\begin{bmatrix} w^1_{1,0}s_0 + w^1_{1,1}s_1 + w^1_{1,2}s_2 & 0 & \{w^3_{3,0}s_3 + w^3_{3,1}s_4 + w^3_{3,2}s_5\}e^{j\theta_r} \\ \{w^1_{1,0}s_3 + w^1_{1,1}s_4 + w^1_{1,2}s_5\}e^{j\theta_r} & w^2_{2,0}s_0 + w^2_{2,1}s_1 + w^2_{2,2}s_2 & 0 \\ 0 & \{w^2_{2,0}s_3 + w^2_{2,1}s_4 + w^2_{2,2}s_5\}e^{j\theta_r} & w^3_{3,0}s_0 + w^3_{3,1}s_1 + w^3_{3,2}s_2 \end{bmatrix}$$

Further, if $N_t=3$ and $R=2$ as in Equation 8a, instead of using rotated combining, the codeword can be depicted as Equation 8b by expanding Equation 2.

$$X_{3\times 2} = \begin{bmatrix} w_{1,0}^1 s_0 + w_{1,1}^1 s_1 + w_{1,2}^1 s_2 & 0 & w_{1,0}^3 s_3 + w_{1,1}^3 s_4 + w_{1,2}^3 s_5 \\ w_{2,0}^1 s_3 + w_{2,1}^1 s_4 + w_{2,2}^1 s_5 & w_{2,0}^2 s_0 + w_{2,1}^2 s_1 + w_{2,2}^2 s_2 & 0 \\ 0 & w_{3,0}^2 s_3 + w_{3,1}^2 s_4 + w_{3,2}^2 s_5 & w_{3,0}^3 s_0 + w_{3,1}^3 s_1 + w_{3,2}^3 s_2 \end{bmatrix}$$

[Equation 8b]

Figure 8:
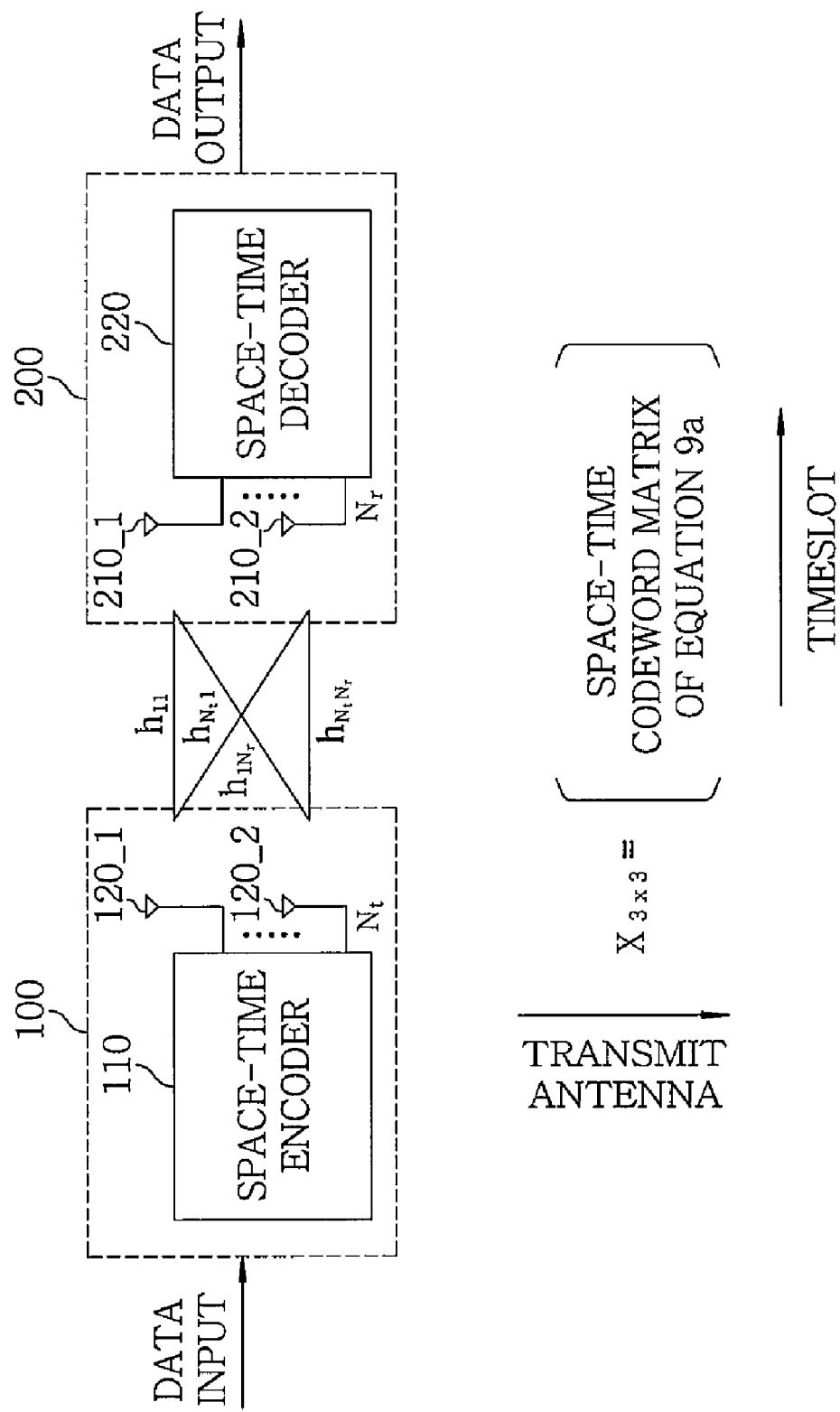
FIG. 8 provides an embodiment of a multiple antenna system using a space-time code in accordance with the present invention, wherein there are three transmit antennas and spatial multiplexing rate is a value of 3.

As an example obtained by expansion of Equation 7, a codeword of a space-time code, if $N_t=3$ and $R=3$, can be represented as Equation 9a. Also, a multiple antenna system using such a space-time codeword matrix is illustrated in FIG. 8.

$$X_{3\times 3} = \begin{bmatrix} w_{1,0}^1 s_0 + w_{1,1}^1 s_1 + w_{1,2}^1 s_2 & \{w_{2,0}^2 s_6 + w_{2,1}^2 s_7 + w_{2,2}^2 s_8\}e^{j\theta_{r2}} & \{w_{3,0}^3 s_3 + w_{3,1}^3 s_4 + w_{3,2}^3 s_5\}e^{j\theta_{r1}} \\ \{w_{1,0}^1 s_3 + w_{1,1}^1 s_4 + w_{1,2}^1 s_5\}e^{j\theta_{r1}} & w_{2,0}^2 s_0 + w_{2,1}^2 s_1 + w_{2,2}^2 s_2 & \{w_{3,0}^3 s_6 + w_{3,1}^3 s_7 + w_{3,2}^3 s_8\}e^{j\theta_{r2}} \\ \{w_{1,0}^1 s_6 + w_{1,1}^1 s_7 + w_{1,2}^1 s_8\}e^{j\theta_{r2}} & \{w_{2,0}^2 s_3 + w_{2,1}^2 s_4 + w_{2,2}^2 s_5\}e^{j\theta_{r1}} & w_{3,0}^3 s_0 + w_{3,1}^3 s_1 + w_{3,2}^3 s_2 \end{bmatrix}$$

[Equation 9a]

In Equation 9a, though the codeword matrix can have a variety of forms, basic concept is that, three symbols are weighted to combine and then transmitted in three antennas for one timeslot, and for other timeslot, the three symbols are combined with different weights and transmitted in other antennas.

Further, if $N_t=3$ and $R=3$ as in Equation 9a, instead of using rotated combining, the codeword can be depicted as Equation 9b by expanding Equation 2.

$$X_{3\times 3} = \begin{bmatrix} w_{1,0}^1 s_0 + w_{1,1}^1 s_1 + w_{1,2}^1 s_2 w_{1,0}^2 s_6 + w_{1,1}^2 s_7 + w_{1,2}^2 s_8 w_{1,0}^3 s_3 + w_{1,1}^3 s_4 + w_{1,2}^3 s_5 \\ w_{2,0}^1 s_3 + w_{2,1}^1 s_4 + w_{2,2}^1 s_5 w_{2,0}^2 s_0 + w_{2,1}^2 s_1 + w_{2,2}^2 s_2 w_{2,0}^3 s_6 + w_{2,1}^3 s_7 + w_{2,2}^3 s_8 \\ w_{3,0}^1 s_6 + w_{3,1}^1 s_7 + w_{3,2}^1 s_8 w_{3,0}^2 s_3 + w_{3,1}^2 s_4 + w_{3,2}^2 s_5 w_{3,0}^3 s_0 + w_{3,1}^3 s_1 + w_{3,2}^3 s_2 \end{bmatrix}$$

[Equation 9b]

Figure 9:
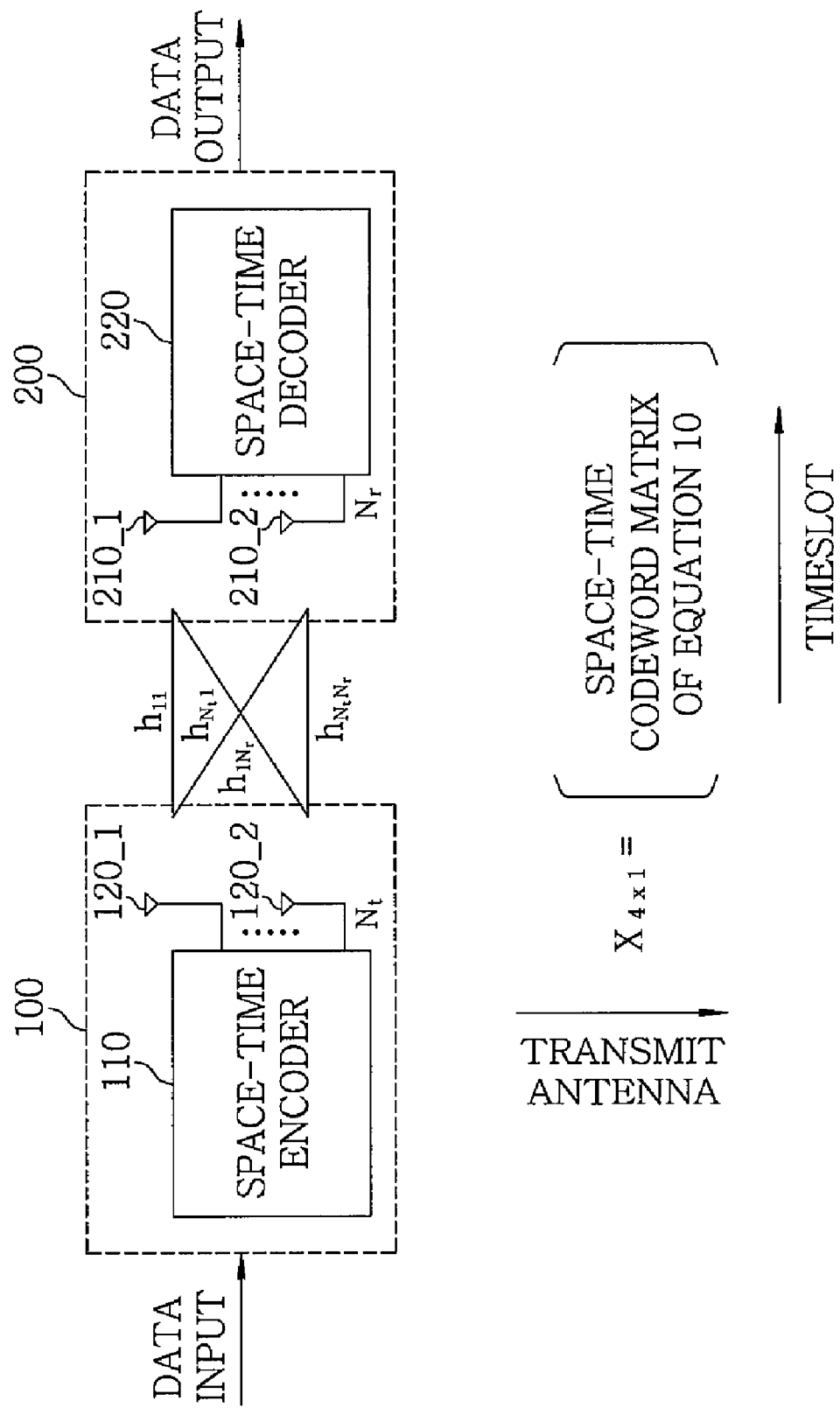
FIG. 9 shows an embodiment of a multiple antenna system using a space-time code in accordance with the present invention, wherein there are four transmit antennas and spatial multiplexing rate is a value of 1.

Finally, a codeword of a space-time code, if $N_t=4$ and $R=1$, can be represented as Equation 10. Also, a multiple antenna system using such a space-time codeword matrix is illustrated in FIG. 9.

$$X_{4\times 1} = \begin{bmatrix} w_{1,0}^1 s_0 + w_{1,1}^1 s_1 + w_{1,2}^1 s_2 + w_{1,2}^1 s_3 & 0 & 0 & 0 \\ 0 & w_{2,0}^2 s_0 + w_{2,1}^2 s_1 + w_{2,2}^2 s_2 + w_{2,2}^2 s_3 & 0 & 0 \\ 0 & 0 & w_{3,0}^3 s_0 + w_{3,1}^3 s_1 + w_{3,2}^3 s_2 + w_{3,2}^3 s_3 & 0 \\ 0 & 0 & 0 & w_{4,0}^4 s_0 + w_{4,1}^4 s_1 + w_{4,2}^4 s_2 + w_{4,2}^4 s_3 \end{bmatrix}$$

[Equation 10]

A condition of determining $w_{i,j}^t$ for generating space-time code in accordance with the present invention is to keep average powers of the signals transmitted through each transmit antenna in one coding block evenly, as shown in Equation 11.

$$|w_{1,0}^1|^2 + |w_{1,1}^1|^2 + \ldots + |w_{1,N_t-1}^1|^2 = P$$

[Equation 11]

-continued $$|w_{2,0}^1|^2 + |w_{2,1}^1|^2 + \ldots + |w_{2,N_t-1}^1|^2 = P$$

$$\vdots$$

$$|w_{N_t,0}^{N_t}|^2 + |w_{N_t,1}^{N_t}|^2 + \ldots + |w_{N_t,N_t-1}^{N_t}|^2 = P$$

Also, because one symbol is transmitted at several timeslots in one coding block, average powers assigned to each symbol in one coding block should be kept evenly, as shown in Equation 12.

$$|w_{1,0}^1|^2 + |w_{2,0}^1|^2 + \ldots + |w_{N_t,0}^{N_t}|^2 = P$$

[Equation 12]

-continued $$|w_{1,1}^1|^2 + |w_{2,1}^1|^2 + \ldots + |w_{N_t,1}^{N_t}|^2 = P$$

$$|w_{1,2}^1|^2 + |w_{2,2}^1|^2 + \ldots + |w_{N_t,2}^{N_t}|^2 = P$$

$$\vdots$$

$$|w_{1,N_t}^1|^2 + |w_{2,N_t}^1|^2 + \ldots + |w_{N_t,N_t}^{N_t}|^2 = P$$

If Equation 11 and Equation 12 are applied to the condition that the number of transmit antennas and spatial multiplexing rate are $N_t=2$, $R=1$ and $N_t=2$, $R=2$, respectively, complex weights $w_{1,0}^1, w_{1,1}^1, w_{2,0}^2, w_{2,1}^2$ satisfy Equation 13.

$$|w_{1,0}^1|^2 + |w_{1,1}^1|^2 = P,$$

$$|w_{2,0}^2|^2 + |w_{2,1}^2|^2 = P,$$

$$|w_{1,0}^1|^2 + |w_{2,0}^2|^2 = P,$$

$$|w_{1,1}^1|^2 + |w_{2,1}^2|^2 = P. \qquad \text{[Equation 13]}$$

Wherein P represents total average power of the signal transmitted through all antennas at one timeslot.

Further, if Equation 11 and Equation 12 are applied to the condition that the number of transmit antennas and spatial multiplexing rate are $N_t=3$, $R=1, 2, 3$, respectively, complex weights $w_{1,0}^1, w_{1,1}^1, w_{1,2}^1, w_{2,0}^2, w_{2,1}^2, w_{2,2}^2, w_{3,0}^3, w_{3,1}^3, w_{3,2}^3$ satisfy Equation 14.

$$|w_{1,0}^1|^2 + |w_{1,1}^1|^2 + |w_{1,2}^1|^2 = P,$$

$$|w_{2,0}^2|^2 + |w_{2,1}^2|^2 + |w_{2,2}^2|^2 = P,$$

$$|w_{3,0}^3|^2 + |w_{3,1}^3|^2 + |w_{3,2}^3|^2 = P,$$

$$|w_{1,0}^1|^2 + |w_{2,0}^2|^2 + |w_{3,2}^3|^2 = P,$$

$$|w_{1,1}^1|^2 + |w_{2,1}^2|^2 + |w_{3,1}^3|^2 = P,$$

$$|w_{1,2}^1|^2 + |w_{2,2}^2|^2 + |w_{3,2}^3|^2 = P. \qquad \text{[Equation 14]}$$

Wherein P represents total average power of the signal transmitted through all antennas at one timeslot.

If Equations 11 and 12 are applied to the condition that the number of transmit antennas and spatial multiplexing rate are $N_t=4$, $R=1$, complex weights $w_{1,0}^1, w_{1,1}^1, w_{1,2}^1, w_{2,0}^2, w_{2,1}^2, w_{2,2}^2, w_{2,3}^2, w_{3,0}^3, w_{3,1}^3, w_{3,2}^3, w_{3,3}^3, w_{4,0}^4, w_{4,1}^4, w_{4,2}^4, w_{4,3}^4$ satisfy Equation 15.

$$|w_{1,0}^1|^2 + |w_{1,1}^1|^2 + |w_{1,2}^1|^2 + |w_{1,3}^1|^2 = P,$$

$$|w_{2,0}^2|^2 + |w_{2,1}^2|^2 + |w_{2,2}^2|^2 + |w_{2,3}^2|^2 = P,$$

$$|w_{3,0}^3|^2 + |w_{3,1}^3|^2 + |w_{3,2}^3|^2 + |w_{3,3}^3|^2 = P,$$

$$|w_{4,0}^4|^2 + |w_{4,1}^4|^2 + |w_{4,2}^4|^2 + |w_{4,3}^4|^2 = P,$$

$$|w_{1,0}^1|^2 + |w_{2,0}^2|^2 + |w_{3,0}^3|^2 + |w_{4,0}^4|^2 = P,$$

$$|w_{1,1}^1|^2 + |w_{2,1}^2|^2 + |w_{3,1}^3|^2 + |w_{4,1}^4|^2 = P,$$

$$|w_{1,2}^1|^2 + |w_{2,2}^2|^2 + |w_{3,2}^3|^2 + |w_{4,2}^4|^2 = P,$$

$$|w_{1,3}^1|^2 + |w_{2,3}^2|^2 + |w_{3,3}^3|^2 + |w_{4,3}^4|^2 = P. \qquad \text{[Equation 15]}$$

Wherein P represents total average power of the signal transmitted through all antennas at one timeslot.

To obtain complex weights for combination of symbols of full-diversity and full-rate space-time code in accordance with the present invention, while satisfying Equation 11 and Equation 12, space-time code may be designed by searching a weight $w_{i,j}^t$ which maximizes the minimum size of a determinant of difference matrixes, or by finding a weight $w_{i,j}^t$ which maximizes the average size of a determinant of difference matrixes. Equation 16 shows a design rule for maximizing the minimum size of a determinant, and Equation 17 provides a design rule for maximizing the average size of a determinant.

$$\max_{X^k \neq X^1} \min |\det(X^k - X^1)|^2 \qquad \text{[Equation 16]}$$

$$\max_{X^k \neq X^1} avg \; |\det(X^k - X^1)|^2 \qquad \text{[Equation 17]}$$

If Equation 16 is applied to the condition that the number of transmit antennas and spatial multiplexing rate are $N_t=2$, $R=1$, complex weights $w_{1,0}^1, w_{1,1}^1, w_{2,0}^2, w_{2,1}^2$ are expressed as Equation 18, and in an exemplary embodiment satisfying Equation 18, the weights can have the values as in Equation 19.

$$w_{1,0}^1 = \frac{e^{j\theta_1}}{\sqrt{(1+r^2)}}, \qquad \text{[Equation 18]}$$

$$w_{1,1}^1 = \frac{re^{j\theta_2}}{\sqrt{(1+r^2)}},$$

$$w_{2,0}^2 = \frac{re^{j\theta_3}}{\sqrt{(1+r^2)}},$$

$$w_{2,1}^2 = \frac{e^{j\theta_4}}{\sqrt{(1+r^2)}}.$$

$$r = 1, \qquad \text{[Equation 19]}$$

$$\theta_1 + \theta_4 = \theta_2 + \theta_3 + \pi,$$

$$\theta_2 = \frac{\pi}{4},$$

$$\theta_4 = \frac{3\pi}{4}.$$

If Equation 16 is applied to the condition that the number of transmit antennas and spatial multiplexing rate are $N_t=2$, $R=2$, complex weights $w_{1,0}^1, w_{1,1}^1, w_{2,0}^2, w_{2,1}^2$ are expressed as Equation 18, and in an exemplary embodiment satisfying Equation 18, the weights can have the values as in Equation 20.

$$r = \frac{\pm 1 + \sqrt{5}}{2}, \qquad \text{[Equation 20]}$$

$$\theta_1 + \theta_4 = \theta_2 + \theta_3 + \pi,$$

$$\theta_2 = 0,$$

$$\theta_4 = \frac{3\pi}{2},$$

$$\theta_r = \frac{\pi}{4}.$$

If Equation 16 is applied to the condition that the number of transmit antennas and spatial multiplexing rate are $N_t=3$, $R=1$, complex weights $w_{1,0}^1, w_{1,1}^1, w_{1,2}^1, w_{2,0}^2, w_{2,1}^2, w_{2,2}^2, w_{3,0}^3, w_{3,1}^3, w_{3,2}^3$ are expressed as Equation 21, and in an exemplary embodiment satisfying Equation 21, the weights can have the values as in Equation 22.

[Equation 21]
$$w_{1,0}^1 = \frac{r_1 e^{j\theta_1}}{\sqrt{(r_1^2 + r_2^2 + r_3^2)}},$$
$$w_{1,1}^1 = \frac{r_2 e^{j\theta_2}}{\sqrt{(r_1^2 + r_2^2 + r_3^2)}},$$
$$w_{1,2}^1 = \frac{r_3 e^{j\theta_3}}{\sqrt{(r_1^2 + r_2^2 + r_3^2)}},$$
$$w_{2,0}^2 = \frac{r_2 e^{j\theta_4}}{\sqrt{(r_1^2 + r_2^2 + r_3^2)}},$$
$$w_{2,1}^2 = \frac{r_3 e^{j\theta_5}}{\sqrt{(r_1^2 + r_2^2 + r_3^2)}},$$
$$w_{2,2}^2 = \frac{r_1 e^{j\theta_6}}{\sqrt{(r_1^2 + r_2^2 + r_3^2)}},$$
$$w_{3,0}^3 = \frac{r_3 e^{j\theta_7}}{\sqrt{(r_1^2 + r_2^2 + r_3^2)}},$$
$$w_{3,1}^3 = \frac{r_1 e^{j\theta_8}}{\sqrt{(r_1^2 + r_2^2 + r_3^2)}},$$
$$w_{3,2}^3 = \frac{r_2 e^{j\theta_9}}{\sqrt{(r_1^2 + r_2^2 + r_3^2)}}.$$

[Equation 22]
$$\theta_1 - \theta_4 = \theta_2 - \theta_5 = \theta_3 - \theta_6 + \pi,$$
$$\theta_3 - \theta_9 = \theta_2 - \theta_8 = \theta_1 - \theta_7 + \pi,$$
$$\theta_4 - \theta_7 = \theta_6 - \theta_9 = \theta_5 - \theta_8 + \pi,$$
$$r_1 = 0.974,$$
$$r_2 = \frac{r_1 r_3}{r_1 + r_3},$$
$$r_3 = 0.381.$$

If Equation 16 is applied to the condition that the number of transmit antennas and spatial multiplexing rate are $N_t=3$, $R=2$, complex weights $w_{1,0}^1, w_{1,1}^1, w_{1,2}^1, w_{2,0}^2, w_{2,1}^2, w_{2,2}^2, w_{3,0}^3, w_{3,1}^3, w_{3,2}^3$ are expressed as Equation 21, and in an exemplary embodiment satisfying Equation 21, the weights can have the values as in Equation 23.

[Equation 23]
$$\theta_1 - \theta_4 = \theta_2 - \theta_5 = \theta_3 - \theta_6 + \pi,$$
$$\theta_3 - \theta_9 = \theta_2 - \theta_8 = \theta_1 - \theta_7 + \pi,$$
$$\theta_4 - \theta_7 = \theta_6 - \theta_9 = \theta_5 - \theta_8 + \pi,$$
$$r_1 = 0.68,$$
$$r_2 = \frac{r_1 r_3}{r_1 + r_3},$$
$$r_3 = 0.52,$$
$$\theta_r = \frac{\pi}{4}.$$

If Equation 16 is applied to the condition that the number of transmit antennas and spatial multiplexing rate are $N_t=3$, $R=3$, complex weights $w_{1,0}^1, w_{1,1}^1, w_{1,2}^1, w_{2,0}^2, w_{2,1}^2, w_{2,2}^2, w_{3,0}^3, w_{3,1}^3, w_{3,2}^3$ are expressed as Equation 21, and in an exemplary embodiment satisfying Equation 21, the weights can have the values as in Equation 24.

[Equation 24]
$$\theta_1 - \theta_4 = \theta_2 - \theta_5 = \theta_3 - \theta_6 + \pi,$$

-continued
$$\theta_3 - \theta_9 = \theta_2 - \theta_8 = \theta_1 - \theta_7 + \pi,$$
$$\theta_4 - \theta_7 = \theta_6 - \theta_9 = \theta_5 - \theta_8 + \pi,$$
$$r_1 = 1,$$
$$r_2 = \frac{r_1 r_3}{r_1 + r_3},$$
$$r_3 = 0.8,$$
$$\theta_{r1} = \frac{\pi}{36},$$
$$\theta_{r2} = \frac{2\pi}{9}.$$

Figure 10:
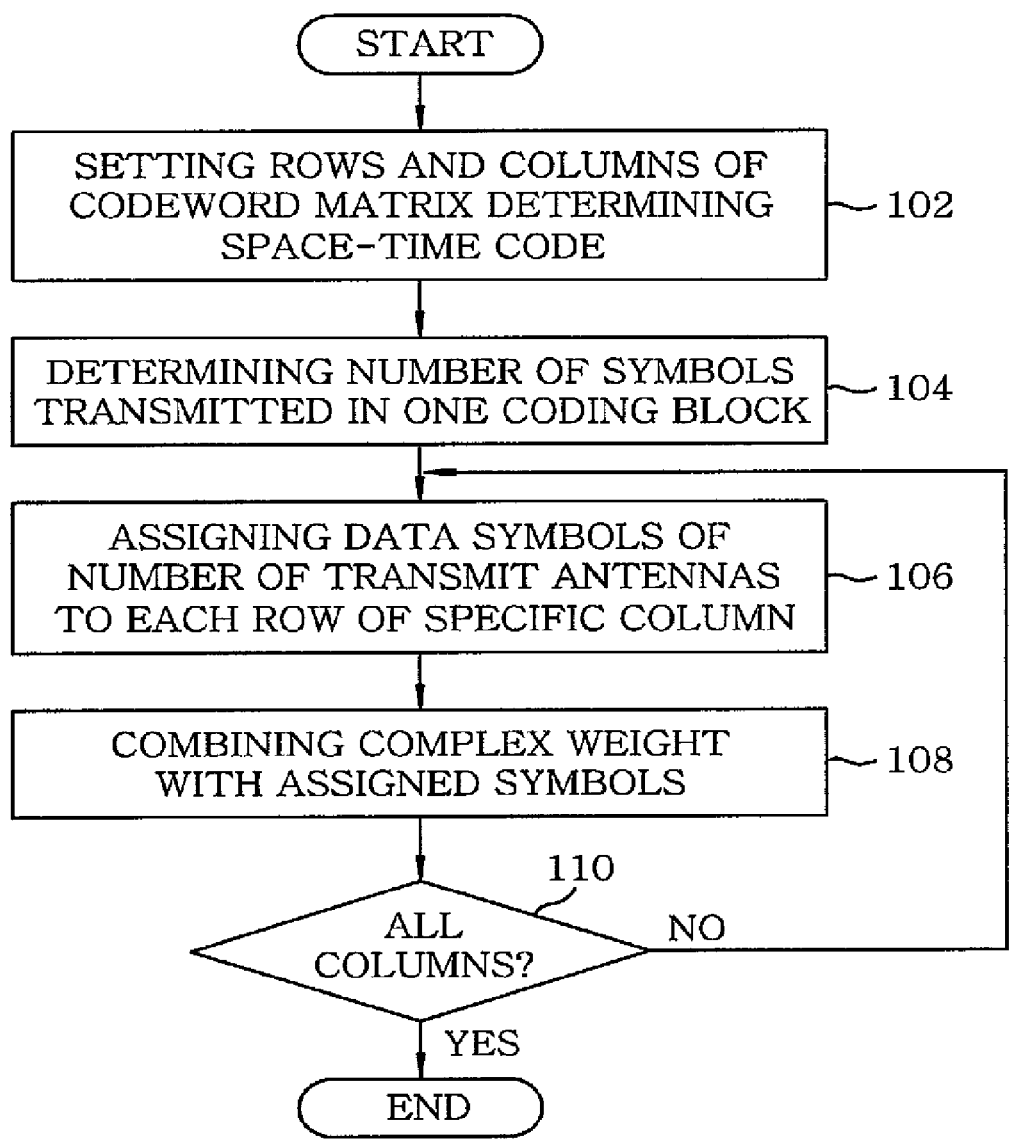
FIG. 10 sets forth a flowchart illustrating an embodiment of a space-time code generating method in accordance with the present invention.

FIG. 10 sets forth a flowchart illustrating preferred embodiment of a space-time code generating method in accordance with the present invention. Hereinafter, the space-time code generating method will be described in detail.

As shown in FIG. 10, after data is inputted into a space-time encoder 110, the space-time encoder 110 sets rows and columns of a codeword matrix determining space-time code (step 102). At this time, the rows of the codeword matrix determining space-time code correspond to combined signals transmitted by each transmit antenna 120_1, ..., 120_N$_t$. In addition, columns of the codeword matrix correspond to timeslots in one coding block. The numbers of rows and columns of a codeword matrix are set to the number of the transmit antennas 120_1, ..., 120_N$_t$ respectively.

After setting the number of rows and columns of the codeword matrix, the number of the symbols to-be-transmitted in one coding block is determined as the number of the transmit antennas 120_1, ..., 120_N$_t$ multiplied by spatial multiplexing rate (step 104).

After determining the number of symbols to-be-transmitted by transmitter 100, a specific column of the matrix is selected, and the symbols of the number of the transmit antennas 120_1, ..., 120_N$_t$ are assigned to the rows of the number of spatial multiplexing rate in the selected column (step 106).

Complex weight corresponding to the symbol assigned in the step 106 is assigned to each symbol, and, thus the symbols are combined with the complex weight (step 108). Herein, complex weights are determined so that the minimum size of a determinant of difference matrixes indicating the differences between the matrixes is maximized, or the average size of a determinant of difference matrixes representing the differences between the matrixes is maximized.

The steps 106 and 108 are repeated on the rest columns except for the selected columns in the step 106, during which different symbols are assigned to each row and each column of the codeword matrix, and different complex weights are assigned to the identical symbols assigned to each column (step 110). It is preferred that, when assigning the symbols to each row of the column adjacent to the selected column in the step 110, the symbols assigned to each row of the specific column be cycle shifted to assign thereto on a basis of column. Further, it is preferred that, when selecting complex weights to-be-combined with symbols, complex weights assigned to each symbol be selected to maintain equally average power of the symbols assigned to each row of the selected column, average power of the total column selected, or average power assigned to each symbol.

While the invention has been shown and described with respect to the preferred embodiments, it will be understood by those skilled in the art that various changes and modifications may be made without departing from the spirit and scope of the invention as defined in the following claims.

What is claimed is:

1. A transmitter transmitting information symbols for use in a MIMO (Multiple Input Multiple Output) system, comprising:
- a space-time encoder for encoding data symbols input using a space-time code; and
- a number of transmit antennas for transmitting the encoded data symbols to a receiver,
- wherein a codeword matrix for transmitting sets of symbols of the number of transmit antennas when multiplied by a spatial multiplexing rate in one coding block, is a square matrix with a dimension equal to the number of the transmit antennas;
- wherein a row of the codeword matrix represents combined signals transmitted by each transmit antenna, and a column of the codeword matrix represents timeslots of the number of the transmit antennas;
- wherein data symbols are transmitted through a number of the rows of the codeword matrix determined based on a number of the spatial multiplexing rate, in each column of the codeword matrix; and
- wherein the symbols of the number of the transmit antennas are combined by way of utilizing complex weights, in each row of the codeword matrix.

2. The transmitter of claim 1, wherein the symbols are assigned only to the transmit antennas determined based on the number of the spatial multiplexing rate at every timeslot in the coding block;
- wherein the number of the symbols assigned to each transmit antenna corresponds to a total number of the transmit antennas; and
- wherein the codeword matrix is determined to make the symbols assigned to each transmit antenna combined by different complex weights and transmitted simultaneously through each transmit antenna.

3. The transmitter of claim 2, wherein the codeword matrix is determined to transmit a same set of symbols as transmitted, at different timeslot, at one timeslot in the coding block;
- assign any symbol to a specific transmit antenna once in the coding block; and
- assign the symbols to all transmit antennas at least once in the coding block.

4. The transmitter of claim 1, wherein the codeword matrix is determined to assign a set of symbols to each transmit antenna by cycle shift, the sets of symbols being cycle shifted on an antenna basis as the timeslots progress.

5. The transmitter of claim 4, wherein the codeword matrix is determined to change complex weights combining a same set of symbols, if the transmit antenna is changed.

6. The transmitter of claim 1, wherein the codeword matrix is determined to equalize average powers of the combined signals transmitted through each transmit antenna in one coding block.

7. The transmitter of claim 1, wherein the codeword matrix is determined to equalize the average powers assigned to each symbol in one coding block.

8. The transmitter of claim 1, wherein the codeword matrix is determined to maximize a minimum size of a determinant of difference matrixes representing the differences between matrixes.

9. The transmitter of claim 1, wherein the codeword matrix is determined to maximize an average size of a determinant of difference matrixes representing the differences between matrixes.

10. The transmitter of claim 1, wherein the space-time code for the spatial multiplexing rate of R is generated by way of rotated combining the space-time code for a spatial multiplexing rate of 1, if the spatial multiplexing rate is R, R being an integer equal to or greater than 2.

11. A method for generating a space-time code used for transmitting information symbols to a receiver in a MIMO (Multiple Input Multiple Output) system having a number of transmit/receive antennas, comprising:
- (a) setting a number of rows and columns of a codeword matrix determining the space-time code as the number of the transmit antennas, respectively, wherein the rows correspond to combined signals transmitted by each transmit antenna and the columns correspond to timeslots in one coding block;
- (b) determining a number of the symbols to-be-transmitted in one coding block as the number of the transmit antennas multiplied by a spatial multiplexing rate;
- (c) selecting a specific column of the matrix, and assigning the symbols of the number of the transmit antennas to a number of rows determined based on a number of spatial multiplexing rate in the selected column;
- (d) assigning complex weights corresponding to the symbols assigned in the step (c) to each symbol to combine the symbols; and
- (e) repeating (c) and (d) on remaining columns except for the selected columns in (c), while different symbols are assigned to each row and each column of the matrix and different complex weights are assigned to same symbols assigned to each column.

12. The space-time code generating method of claim 11, wherein (e) includes assigning the symbols assigned to each row of the specific column selected, by cycle shifting on a basis of the column, when assigning the symbols to each row of the column adjacent to the specific column selected.

13. The space-time code generating method of claim 11, further comprising: after (e), selecting complex weights assigned to each symbol to equalize average power of the symbols assigned to each row of the selected column, average power of a total of the symbols in the specific column selected, or average power assigned to each symbol.

14. The space-time code generating method of claim 11, wherein the complex weights are selected to maximize a minimum size of a determinant of a difference matrix representing the differences between matrixes, or to maximize an average size of a determinant of the difference matrix representing the differences between matrixes.

15. A multiple antenna system having a number of transmit/receive antennas, comprising:
- a transmitter for generating space-time code to transmit data symbols through the transmit antennas in one coding block, the space-time code corresponding to the symbols of the number of the transmit antennas multiplied by a spatial multiplexing rate; and
- a receiver for receiving data symbols transmitted by the transmitter by way of utilizing a number of receive antennas to restore correspondent symbols by decoding the space-time code,
- wherein the space-time code has a codeword matrix, the codeword matrix being a square matrix with a dimension equal to the number of the transmit antennas, a row of the codeword matrix representing combined signals transmitted by each transmit antenna and a column of the codeword matrix representing timeslots of the number of the transmit antennas;
- wherein data symbols are transmitted only through a number of the rows determined based on a number of spatial multiplexing rate, in each column of the matrix; and wherein data symbols of the number of the transmit antennas are combined by utilizing complex weights, in each row of the matrix.

16. The multiple antenna system of claim 15, wherein the symbols are assigned only to the transmit antennas determined based on of the number of spatial multiplexing rate for every timeslot in the coding block;

wherein the number of the symbols assigned to each transmit antenna corresponds to a total number of the transmit antennas; and wherein the codeword matrix is determined to make the symbols assigned to each transmit antenna combined by different complex weights and transmitted simultaneously through each transmit antenna.

17. The multiple antenna system of claim 15, wherein the receiver comprises an ML (Maximum Likelihood) decoder, a sphere decoder, or a linear decoder.

* * * * *